United States Patent [19]

Lacey

[11] 3,960,735

[45] June 1, 1976

[54] CORROSION-INHIBITED POLYPHOSPHATE COMPOSITIONS

[75] Inventor: Kathleen P. Lacey, Phoenix, Ariz.

[73] Assignee: Early California Industries, Inc., Phoenix, Ariz.

[22] Filed: Aug. 15, 1974

[21] Appl. No.: 497,699

[52] U.S. Cl. ................................... 252/2; 21/2.5 R; 21/2.5 A; 21/2.7 R; 21/2.7 A; 106/14; 252/8.1; 252/387; 252/385; 252/389 R; 252/389 A; 428/920; 428/921

[51] Int. Cl.² .................... A62D 1/00; C23F 11/04; C23F 11/08; C23F 11/10

[58] Field of Search ............... 252/2, 8.1, 387, 385, 252/389 R, 389 A; 428/920, 921; 21/2.5 R, 2.5 A, 2.7 R, 2.7 A; 106/14

[56] References Cited
UNITED STATES PATENTS

| | | | |
|---|---|---|---|
| 2,515,529 | 7/1950 | Ryznar et al. | 252/387 |
| 2,901,437 | 8/1959 | Bailey et al. | 252/387 |
| 3,151,087 | 9/1964 | Ryznar et al. | 252/387 |
| 3,245,904 | 4/1966 | Young | 252/2 |
| 3,257,316 | 6/1966 | Langguth et al. | 252/387 |
| 3,275,562 | 9/1966 | Smith | 252/387 |
| 3,309,324 | 3/1967 | Langguth et al. | 252/387 |
| 3,542,686 | 11/1970 | Miller | 252/387 |
| 3,730,890 | 5/1973 | Nelson | 252/2 |
| 3,809,653 | 5/1974 | Sansing et al. | 252/389 A |

*Primary Examiner*—Benjamin R. Padgett
*Assistant Examiner*—T. S. Gron
*Attorney, Agent, or Firm*—Drummond, Nelson & Ptak

[57] ABSTRACT

The tendency of polyphosphate liquids to corrode aluminum is inhibited by incorporating into the liquid a minor effective amount of an iron cyanide blue, either ferric ferrocyanide or ferrous ferricyanide.

8 Claims, No Drawings

CORROSION-INHIBITED POLYPHOSPHATE COMPOSITIONS

This invention relates to corrosion-inhibited liquid polyphosphate compositions.

More particularly, the invention concerns polyphosphate liquids having a substantially reduced tendency to corrode aluminum.

In a more particular respect, the invention concerns fire-retardant compositions consisting of polyphosphate liquids containing a corrosion inhibitor specially adapted to significantly reduce the corrosivity of fire-retardant compositions to aluminum aircraft parts, thereby specially adapting said fire-retardant compositions for aerial application.

In the early 1960's, the aerial application of fire-retardant compositions to prevent or retard the spread of forest fires, range fires, etc., became very widespread. Typically, these fire-retardant compositions contained an electrolytic fire-suppressing salt such as ammonium phosphate, ammonium sulphate, etc., viscosity modifiers and other components such as pigments or dyes. A typical retardant composition of the type described above is disclosed in the patent to Nelson, U.S. Pat. No. 3,196,108. Another such composition is described in the patent to Langguth et al., U.S. Pat. No. 3,257,316. These compositions generally consisted of an aqueous solution of the fire-suppressing salt such as mono or di-ammonium orthophosphate, a thickening agent such as attapulgite clay, guar gum, algin, or the like, along with coloring agents or dyes to improve the visibility of the material after it is dropped, and common corrosion inhibitors such as potassium dichromate.

More recently, polyphosphate liquids have been used as aerially applied fire retardants. These polyphosphate liquids have certain advantages in comparison to the prior art compositions described above since they can be transported and stored prior to use in the liquid form rather than being batch-mixed from dry ingredients at the air-tanker base. However, the corrosion inhibitors used in the prior art fire-retardant compositions do not perform satisfactorily in the polyphosphate liquids because they are chemically imcompatible with polyphosphates and are generally ineffective due to the extreme corrosivity of the polyphosphates.

Prior to the invention described herein, no satisfactory method had been developed for inhibiting the corrosiveness of polyphosphate fire-retardant liquid compositions to meet the aluminum corrosion specifications imposed by the United States government for so-called "Type A" aerially applied fire-retardants. (See, e.g., "Interim Specification" 5100-00302a, (June 1972), superseding "Interim Specification" 5100-00302, (June, 1970)). These specifications require that the fire-retardant composition shall not cause corrosion of a standard aluminum alloy in excess of one mil per year. In practice, this specification was unobtainable until the present invention and the specification was apparently simply not enforced.

Accordingly, it would be highly desirable to provide a polyphosphate liquid having a substantially reduced tendency to corrode aluminum, thereby improving the utility of the polyphosphate liquid as an aerially applied fire-retardant composition.

I have now discovered novel polyphosphate liquid compositions having markedly reduced tendencies to corrode aluminum which meet the corrosion specifications (identified above) imposed by the federal government for aerially applied fire retardants.

Briefly, according to my invention, I provide a composition consisting essentially of an ammonium polyphosphate liquid and an iron cyanide blue. The iron cyanide blue is present in the composition in a minor amount effective to substantially reduce the corrosiveness of the composition to aluminum.

As used herein, the term "iron cyanide blue" means the blue-colored compounds commonly identified as "Prussian Blue" and "Turnbull's Blue". Prussian Blue, $Fe_4[Fe(CN)_6]_3$, is obtained through the combination of the ferric ion with the ferrocyanide ion, viz.,

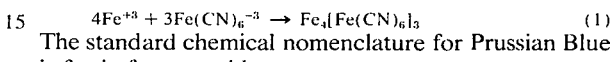

$$4Fe^{+3} + 3Fe(CN)_6^{-3} \rightarrow Fe_4[Fe(CN)_6]_3 \qquad (1)$$

The standard chemical nomenclature for Prussian Blue is ferric ferrocyanide.

Turnbull's Blue, $Fe_2[Fe(CN)_6]_2$, is obtained through the combination of the ferrous ion with the ferricyanide ion, viz.,

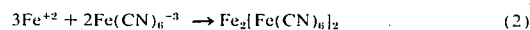

$$3Fe^{+2} + 2Fe(CN)_6^{-3} \rightarrow Fe_2[Fe(CN)_6]_2 \qquad (2)$$

The standard chemical nomenclature for Turnbull's Blue is ferrous ferricyanide.

The literature on the iron cyanide blues is both confusing and controversial. There is still a disagreement as to whether ferrous ferricyanide and ferric ferrocyanide are separate compounds, whether only one compound can exist owing to the presence of a resonating system,

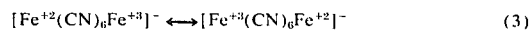

$$[Fe^{+2}(CN)_6Fe^{+3}]^- \longleftrightarrow [Fe^{+3}(CN)_6Fe^{+2}]^- \qquad (3)$$

or whether the two compounds are in fact identical.

For the purpose of this description, however, such conflict in the literature as to the exact nature of the iron cyanide blues need not be resolved. As will appear below, it is only necessary to understand that when a ferrocyanide is utilized to form the "blue," one reacts it with a ferric compound and, if a ferricyanide is used as a starting material to obtain the blue, one reacts it with a ferrous compound.

According to the presently preferred embodiment of the invention, the corrosion-inhibited polyphosphate liquid is prepared by incorporating into the liquid compounds which react in situ to form a minor effective amount of the iron cyanide blue. This is preferably accomplished by introducing into the polyphosphate liquid an alkali metal ferrocyanide or an alkali metal ferricyanide and iron compounds. If the alkali metal ferrocyanide is employed, one introduces a ferric compound; if the alkali metal ferricyanide is introduced, one employes a ferrous compound.

At present, because of cost and availability considerations, sodium and potassium ferrocyanide and sodium and potassium ferricyanide are the preferred sources of the iron - cyanide complex. Red iron oxide ($Fe_3O_4$) or ferric tartrate are the preferred ferric compounds. Ferrous oxide and ferrous sulphate are the preferred ferrous compounds.

As will be apparent to those skilled in the art, the polyphosphate liquid compositions of the present invention may, and preferably do, also contain other functional components such as dyes or coloring agents, suspending agents, etc. For example, in a presently preferred embodiment of the invention, the fire-retardant composition is prepared generally in accordance with the disclosure of the Nelson patent, U.S.

3,730,890, and includes, in addition to the ammonium polyphosphate liquid, at least one polyphosphate insoluble and non-suspendible component such as thickeners or coloring agents and a sufficient quantity of attapulgite clay to carry each of the non-suspendible components uniformly suspended in the composition.

To achieve the objectives of the invention, the iron cyanide blue must be present in the inhibited polyphosphate liquid composition in a minor amount effective to reduce the corrosiveness of the composition to aluminum to less than or equal to one mil per year as determined by the "Uniform Corrosion" test set forth in Section 4.3.4 of the "Interim Specification" 5100-00302a (June 1972), entitled "Specification for Retardant, Forest Fire, Liquid Chemical, Unthickened for Aircraft or Ground Application," issued by the United States Department of Agriculture, Forest Service. The exact amount of the iron cyanide blue to be present in the polyphosphate liquid composition will vary somewhat depending on the exact nature of the composition. For example, a highly viscous composition will require a somewhat higher concentration of the iron cyanide blue because of the increased tendency of the composition to adhere to aluminum metal. Incorporation of other typical fire-retardant components such as dyes, coloring agents, suspending agents, etc., may also affect the minimum required iron cyanide blue composition. Accordingly, it is not possible to precisely state the minimum concentration of iron cyanide blue in the fire-retardant composition which will be effective to reduce the aluminum corrosion rate of the composition to below or equal to one mil per year. However, in general the minimum amount can be determined very quickly by routine tests conducted by those already skilled in the art utilizing the test procedures set forth in the above-described USDA specification. A rather quick and simple determination can be made by simply observing whether the fire-retardant composition contains sufficient iron cyanide blue to cause the formation of a uniform blue coloration of the aluminum metal or alloy.

Illustratively, when polyphosphate liquid fire-retardant compositions of the type generally described in the Nelson U.S. Pat. No. 3,730,890 are inhibited according to the present invention, one employs about 1.5 parts by weight of sodium ferrocyanide and 1.5 parts by weight of red iron oxide per 100 parts of the final composition to form the intermediate "concentrate" which is suitable for storage and later dilution with water to form the final aerially applied composition.

The in situ formation of the iron cyanide blue is preferred but the reaction could be carried out between the iron cyanide complex and the ferric or ferrous compound, forming the iron cyanide blue which is then added to the polyphosphate liquid. The reactions occur at satisfactory rate and degree of completion at ambient conditions and no special equipment is required except that which is normally employed to thoroughly mix the components of prior art fire-retardant compositions.

The following examples are presented to illustrate the preferred practice of the invention and to assist in distinguishing the invention from the prior art.

EXAMPLE I

The corrosivity of various liquid ammonium polyphosphate compositions to Aluminum Alloy 2024T3 was tested. The compositions were prepared by mixing the iron-cyanide complex compounds and iron compounds into the ammonium polyphosphate liquid in a high-shear mixer. The mixing was continued for a period of 15 minutes. The specific iron-cyanide compounds and iron compounds and their respective proportions (% by weight) in the final composition are indicated in Table A. The various compositions were then tested for corrosivity as follows: A Magna Corrater corrosion rate meter was employed. The aluminum alloy probe was immersed in the test sample under static conditions for 16 hours for conditioning. The conditioned probe was then immersed in the sample under dynamic conditions in which the probe was positioned 1 inch off center in a rotating jar of the test sample (rotation speed = 1 rpm). The test probe was then rinsed with a very gentle lukewarm stream of water, air-dried and then re-immersed in the sample and monitored under dynamic conditions for an additional eight hours. Then the probe was given a hard rinse with a high-pressure water stream and allowed to dry. Finally, the probe was then re-immersed in the test sample and monitored under dynamic conditions for a period of three additional hours. At the end of the last three-hour period, the corrosion data was recorded (as mils per year). The following results were obtained:

Table A

| Iron-Cyanide Compound | | Iron Compound | | Corrosion Rate Mils Per Yr. |
|---|---|---|---|---|
| % | Type | % | Type | |
| 0 | — | 0 | — | 24.3 |
| 0.5 | Potassium Ferrocyanide | 1.5 | $Fe_3O_4$ | 10.62 |
| 1.5 | " | 1.5 | " | .18 |
| 0.1 | Sodium Ferrocyanide | 1.5 | $Fe_3O_4$ | 12.0 |
| 0.25 | " | 1.5 | " | 15.3 |
| 1.00 | " | 1.5 | " | 4.68 |
| 1.25 | " | 1.5 | " | .27 |
| 1.50 | Sodium Ferrocyanide | 0 | $Fe_3O_4$ | 1.62 |
| 1.50 | " | 1.0 | " | 1.26 |
| 1.50 | " | 1.5 | " | .07 |
| 1.50 | " | 2.5 | " | 0 |
| 1.5 | Sodium Ferrocyanide | 1.5 | Ferric Tartrate | 0.6 |

EXAMPLE II

Additional samples of 10-34-0 liquid ammonium polyphosphate were mixed with various known prior art inhibitors and tested in accordance with the procedure of Example I with the following results:

Table B

| Inhibitor System | Corrosion Rate |
|---|---|
| 1.5% Sodium Thiosulfate 0.1% Sodium Molybdate 0.1% Mercapto Benzothiazole | 3.87 |
| 2.0% Sodium Dichromate | 1.44 |
| 1.0% Sodium Silicofluoride | 65.7 |
| 1.5% Potassium Thiocyanate | 17.10 |

EXAMPLE III

A fire-retardant "concentrate" was prepared having the following composition:

Table C

| | % by Wt. |
|---|---|
| 10-34-0 | 92.87 |
| Attapulgite Clay | 3.91 |
| Red Iron Oxide | 1.50 |
| 6 BL Dye | 0.22 |
| Sodium Ferrocyanide | 1.50 |

Table C-continued

| Total | 100.00 |
| --- | --- |

The above composition was prepared by pumping the 10-34-0 into a mixer equipped with a high-shear impeller. With the impeller activated, the dry ingredients were added slowly and the resultant composition was mixed for 15 minutes. The resulting concentrate is suitable for extended storage and is then diluted with water at a ratio of 3:1 to 7:1 parts of water per part of concentrate just prior to field application. This composition is especially adatped for aerial application by helicopter. The aluminum corrosion rate of this composition as determined by the procedure of Example I is less than 1 mil per year.

EXAMPLE IV

The following compounds mixed with liquid ammonium polyphosphate in the indicated proportions (% by wt. of total composition) yield inhibited compositions having an aluminum corrosion rate as determined by the procedure of Example I of less than 1 mil per year:

Table D

| Iron-Cyanide Compound Type | % | Iron Compound Type | % |
| --- | --- | --- | --- |
| Potassium Ferrocyanide | 1.50 | Ferric Arsenate | 1.50 |
| Sodium Ferrocyanide | 2.0 | Ferric Hydroxide | 2.00 |
| Potassium Ferrocyanide | 1.25 | Ferric Ammonium Oxalate | 2.00 |
| Sodium Ferrocyanide | 2.00 | Ferric Sulfide | 2.50 |
| Potassium Ferricyanide | 1.25 | Ferrous Phosphate | 1.75 |
| Sodium Ferricyanide | 1.75 | Ferrous Oxide | 1.75 |
| Sodium Ferricyanide | 1.50 | Ferrous Arsenate | 2.00 |

Having described my invention in such clear and concise and exact terms as to enable those skilled in the art to which it pertains to understand and practice it, and having identified the presently preferred embodiment thereof,

I claim:

1. A composition consisting essentially of
   a. ammonium polyphosphate liquid, and
   b. an iron cyanide blue,
said iron cyanide blue being present in a minor amount effective to substantially reduce the corrosiveness of said composition to aluminum to less than or equal to 1 mil per year as determined by the "Uniform Corrosion" test set forth in Section 4.3.4 of the "Interim Specification" 5100-00302a (June 1972), entitled "Specification for Retardant, Forest Fire, Liquid Chemical, Unthickened for Aircraft or Ground Application," issued by the United States Department of Agriculture, Forest Service.

2. The composition of claim 1 in which said iron cyanide blue is ferric ferrocyanide.

3. The composition of claim 1 in which said iron cyanide blue is ferrous ferricyanide.

4. A process for preparing an ammonium polyphosphate liquid having reduced tendency to corrode aluminum, comprising incorporating into said ammonium polyphosphate liquid compounds which react in situ to form a minor effective amount of an iron cyanide blue.

5. The process of claim 4 in which said iron cyanide blue is ferric ferrocyanide.

6. The process of claim 4 in which said iron cyanide blue is ferrous ferricyanide.

7. The process of claim 4 in which said compounds are an alkali metal ferrocyanide and a ferric compound.

8. The process of claim 4 in which said compounds are an alkali metal ferricyanide and a ferrous compound.

* * * * *